United States Patent
Kimura et al.

(10) Patent No.: US 7,551,171 B2
(45) Date of Patent: Jun. 23, 2009

(54) VOLTAGE SUPPLY CIRCUIT, VOLTAGE SUPPLY METHOD, ELECTRO-OPTICAL DEVICE, AND ELECTRONIC APPARATUS

(76) Inventors: Fusashi Kimura, c/o Seiko Epson Corporation, 3-5, Owa 3-chome, Suwa, Nagano (JP) 392-8502; Satoshi Yatabe, c/o Seiko Epson Corporation, 3-5, Owa 3-chome, Suwa, Nagano (JP) 392-8502; Kenichi Tajiri, c/o Seiko Epson Corporation, 3-5 Owa 3-chome, Suwa, Nagano (JP) 392-8502

( * ) Notice: Subject to any disclaimer, the term of this patent is extended or adjusted under 35 U.S.C. 154(b) by 680 days.

(21) Appl. No.: 11/211,357

(22) Filed: Aug. 25, 2005

(65) Prior Publication Data

US 2006/0056119 A1    Mar. 16, 2006

(30) Foreign Application Priority Data

Sep. 14, 2004   (JP)   ............................. 2004-267049

(51) Int. Cl.
G09G 5/00   (2006.01)
(52) U.S. Cl. ..................................... 345/211
(58) Field of Classification Search ............. 345/94–96, 345/208–213; 315/169.1
See application file for complete search history.

(56) References Cited

U.S. PATENT DOCUMENTS

| | | | | |
|---|---|---|---|---|
| 6,166,671 A * | 12/2000 | Kitagawa et al. | ............ | 341/139 |
| 6,603,673 B2 * | 8/2003 | Yamamoto | .................... | 363/60 |
| 6,717,449 B2 * | 4/2004 | Tamiya et al. | ................ | 327/308 |
| 7,091,709 B2 * | 8/2006 | Suzuki | ........................ | 323/274 |
| 7,129,939 B2 | 10/2006 | Toyozawa | | |
| 7,154,332 B2 * | 12/2006 | Tsuchi | ........................ | 330/255 |
| 7,408,543 B2 * | 8/2008 | Kimura et al. | .............. | 345/211 |
| 2004/0212421 A1 * | 10/2004 | Naka et al. | .................. | 327/541 |

FOREIGN PATENT DOCUMENTS

| | | |
|---|---|---|
| JP | 2000-278938 | 10/2000 |
| JP | 2001-051662 | 2/2001 |
| JP | 2001-051663 | 2/2001 |
| JP | 2001-117649 | 4/2001 |
| JP | 2003-169466 | 6/2003 |
| JP | 2004-248497 | 9/2004 |

OTHER PUBLICATIONS

Communication from Japanese Patent Office regarding counterpart application.

* cited by examiner

*Primary Examiner*—Richard Hjerpe
*Assistant Examiner*—Tom V Sheng
(74) *Attorney, Agent, or Firm*—Harness, Dickey & Pierce, P.L.C.

(57) ABSTRACT

A voltage supply circuit includes a first holding element with a first end and a second end that supplies a voltage held between the first end and the second end to a load, the second end being connected to a ground, and a second holding element with a first end and a second end, the first end of the second holding element being electrically connected to the first end of the first holding element. The voltage supply circuit also includes a charging circuit that charges the second holding element with a voltage higher than the voltage to be supplied to the load in a first mode, and a potential adjusting circuit that shifts a potential at the second end of the second holding element towards a potential at the first end of the first holding element according to the voltage held by the first holding element or the second holding element in a second mode exclusive with respect to the first mode.

7 Claims, 7 Drawing Sheets ular apparatuses, display devices incorporated in such electronic apparatuses include electro-optical elements meeting the demands, such as liquid crystal elements. A voltage necessary for driving the electro-optical elements is higher than a voltage of 3 to 5 V for operating a logic circuit in the electronic apparatuses, and fundamentally is an AC driving voltage. Thus, both positive and negative voltages are required.

VOLTAGE SUPPLY CIRCUIT, VOLTAGE SUPPLY METHOD, ELECTRO-OPTICAL DEVICE, AND ELECTRONIC APPARATUS

RELATED APPLICATIONS

This application claims priority to Japanese Patent Application No. 2004-267049 filed Sep. 14, 2004 which is hereby expressly incorporated by reference herein in its entirety.

BACKGROUND OF THE INVENTION

1. Technical Field

The present invention relates to a technique for supplying a low-ripple voltage to loads.

2. Related Art

Due to the demands for thin and light design of portable electronic apparatuses, display devices incorporated in such electronic apparatuses include electro-optical elements meeting the demands, such as liquid crystal elements. A voltage necessary for driving the electro-optical elements is higher than a voltage of 3 to 5 V for operating a logic circuit in the electronic apparatuses, and fundamentally is an AC driving voltage. Thus, both positive and negative voltages are required.

Such electronic apparatuses therefore require a power supply circuit for boosting a single DC voltage of a DC power source such as a battery to produce a positive voltage and inverting the positive voltage to a negative voltage. There are many types of power supply circuits. Among them, a typical power supply circuit used in compact, simple, low-power-consumption portable electronic apparatuses is configured such that a voltage boosted by a turn-on and turn-off (or switching) operation is held and smoothed by a capacitor (or holding element) disposed at the output stage before the voltage is supplied to a load (see, for example, Japanese Unexamined Patent Application Publications No. 2000-278938 and No. 2001-117649).

Although the capacitor is disposed at the output stage of the power supply circuit, the voltage across the capacitor is boosted by switching, and is stepped down by the power consumption of the load, thus causing a ripple. The ripple causes the root-mean-square (RMS) voltage applied to the electro-optical elements to change, and affects the display quality. Thus, the lower the ripple, the better.

SUMMARY

An advantage of the invention is that it provides a voltage supply circuit, a voltage supply method, an electro-optical device, and an electronic apparatus in which a low-ripple voltage can be supplied.

According to an aspect of the invention, there is provided a voltage supply circuit. The voltage supply circuit includes a first holding element with a first end and a second end, and a second holding element with a first end and a second end. The first holding element supplies a voltage held between the first end and the second end of the first holding element to a load. The second end of the first holding element is connected to a ground. The first end of the second holding element is electrically connected to the first end of the first holding element. The voltage supply circuit also includes a charging circuit and a potential adjusting circuit. In a first mode, the charging circuit charges the second holding element with a voltage higher than the voltage to be supplied to the load. In a second mode exclusive with respect to the first mode, the potential adjusting circuit shifts a potential at the second end of the second holding element towards a potential at the first end of the first holding element according to the voltage held by the first holding element or the second holding element. In the voltage supply circuit, an excessive portion of the voltage charged in the first mode can be used to reduce the amount of ripple in the output voltage in the second mode. That is, the potential at the second end of the second holding element is shifted towards the potential at the first end of the first holding element according to the voltage held across the first or second holding element, thus reducing the amount of ripple in the output voltage.

In accordance with an embodiment of the invention, it is preferable that the potential adjusting circuit shifts the potential at the second end of the second holding element so that the voltage held by the first holding element is equal to a predetermined target voltage. This allows for feedback control on the potential at the second end of the second holding element so that the voltage held by the first holding element is equal to the target voltage.

It is preferable that the potential adjusting circuit includes an operational amplifier and a variable resistor. The operational amplifier receives a voltage corresponding to the voltage held by the first holding element and a reference voltage corresponding to the target voltage, and outputs a voltage in proportion to the difference between the received voltage and reference voltage. The variable resistor is electrically connected between a predetermined potential line and the second end of the first holding element, and has a variable resistance depending on an output voltage from the operational amplifier. This allows the resistance of the variable resistor to be controlled so that the voltage held by the first holding element is equal to the target voltage.

It is preferable that the charging circuit includes a determination unit, a first switching element, and a second switching element. In the second mode, the determination unit determines whether or not the potential at the second end of the second holding element reaches a predetermined threshold value, and changes to the first mode for a predetermined period of time when the determination unit determines that the potential reaches the predetermined threshold value. In the first mode, the first switching element is turned on to connect the second end of the second holding element to a feeder supplying the voltage higher than the voltage to be supplied to the load. In the second mode, the second switching element is turned on to connect the second end of the second holding element to an end of the variable resistor.

According to another aspect of the invention, there is provided a voltage supply method.

According to a further aspect of the invention, there is provided an electro-optical device including the above-described voltage supply circuit, pixels disposed at intersections of a plurality of scanning lines and a plurality of data lines, a scanning line driving circuit, and a data line driving circuit. The scanning line driving circuit sequentially selects the scanning lines, and applies the voltage held in the first holding element to a selected scanning line as a selection voltage. The data line driving circuit supplies data signals via the data lines to pixels corresponding to the scanning line to which the selection voltage is applied. In the electro-optical device, a low-ripple voltage held in the first holding element in the potential adjusting circuit can be used as a selection voltage to be applied to the scanning lines, thus preventing a reduction in display quality.

In the above-described power supply circuit, the voltage produced by a switching-on/off operation is held in the second holding element, and shifting of the potential is not enabled (the first mode). In the electro-optical device, therefore, it is preferable that the change from the second mode to the first mode is prohibited in a period during which the voltage held in the first holding element is applied as the selection voltage.

According to a still further aspect of the invention, there is provided an electronic apparatus including the above-described electro-optical device. Thus, the reduction in display quality due to a ripple can be prevented.

BRIEF DESCRIPTION OF THE DRAWINGS

The invention will be described with reference to the accompanying drawings, wherein like numbers reference like elements, and wherein.

DESCRIPTION OF THE EMBODIMENTS

An embodiment of the invention will be described with reference to the drawings.

Figure 1:
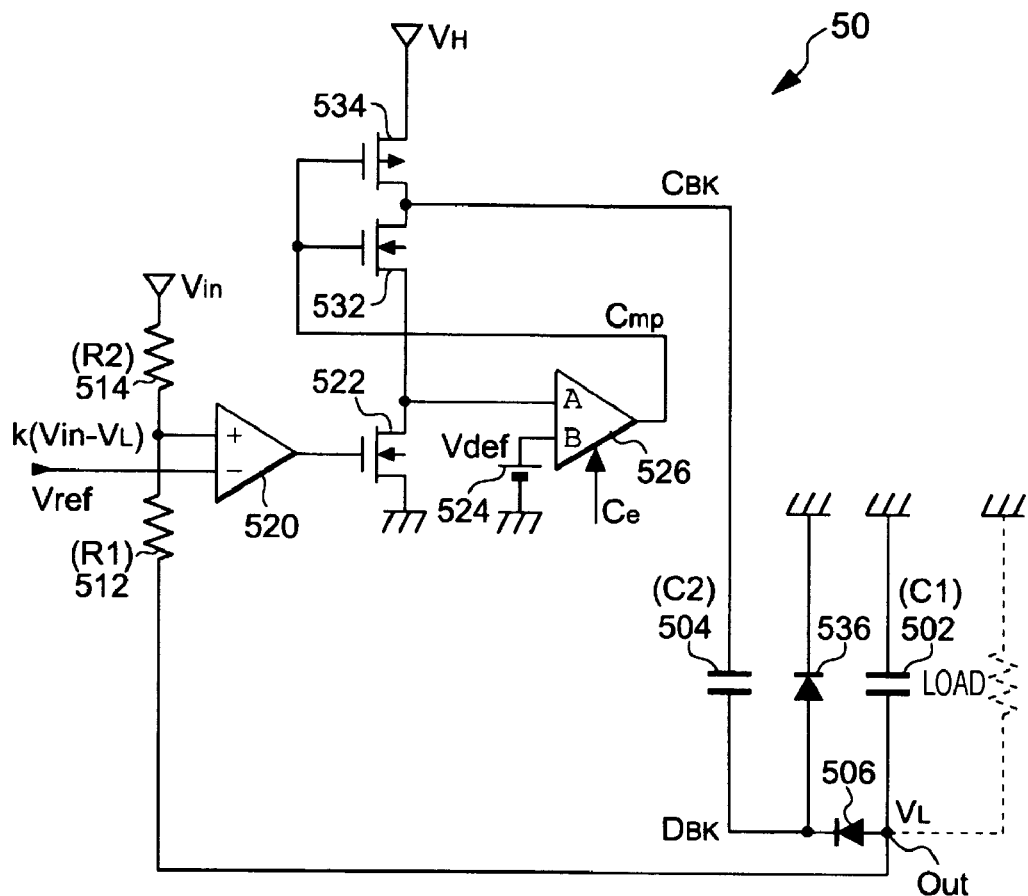
FIG. 1 is a circuit diagram of a voltage supply circuit according to an embodiment of the invention.

FIG. 1 shows a voltage supply circuit 50 according to an embodiment of the invention.

Figure 2:
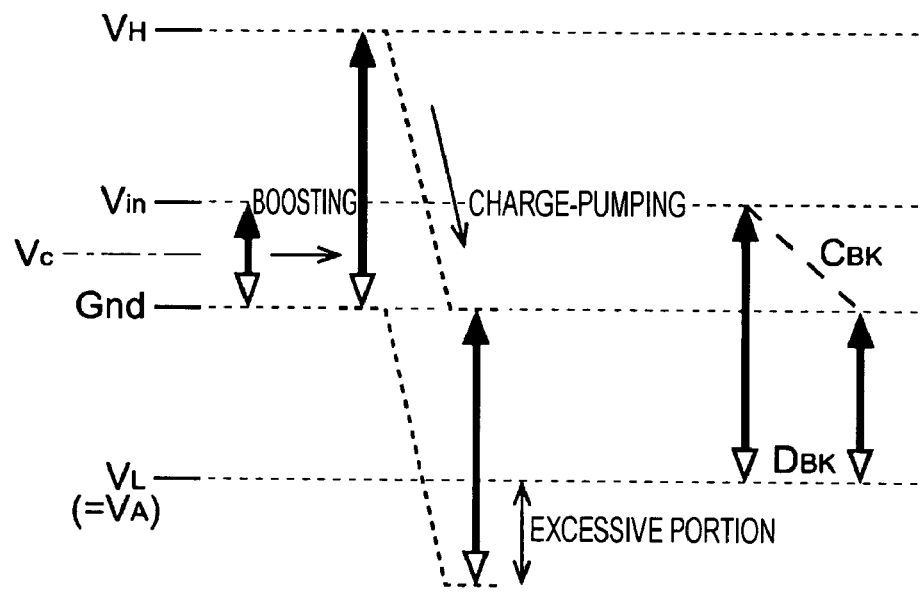
FIG. 2 is a chart showing the relationship among voltages in the voltage supply circuit.

The voltage supply circuit 50 is a charge-pump type circuit that inverts a voltage $V_H$ to a negative voltage to produce a voltage $V_L$. A booster circuit (not shown) boosts a battery voltage Vin to produce the voltage $V_H$. The relationship among the voltages Vin, Gnd, $V_H$, and $V_L$ is shown in FIG. 2. The voltages $V_H$ and $V_L$ are high-level and low-level voltages, respectively, which are symmetric about a center voltage Vc of the voltages Vin and Gnd.

When the voltage ($V_H$–Gnd) is decreased by a charge pump circuit to reduce the high level of the voltage ($V_H$–Gnd) to the ground level Gnd, the voltage (Vin–Gnd) is excessive on the low-level side. In the present embodiment, the excessive voltage is used to reduce the amount of ripple. Specifically, the high-level voltage is decreased according to the power consumption of loads. The voltage $V_L$ is represented by an expression including the polarity.

In FIG. 1, a capacitor (first holding element) 502 has a first end connected to an output terminal Out and a second end connected to the ground Gnd. The voltage $V_L$ held between the first and second ends of the capacitor 502 is supplied to a load. A capacitor (second holding element) 504 has a first end connected to the first end of the capacitor 502 (or the terminal Out) via a diode 506 connected in the reverse direction, and a second end connected to the ground Gnd via a diode 536 connected in the forward direction.

In the present embodiment, the voltages are represented based on the ground potential Gnd unless specifically defined. For convenience of illustration, the voltage at the first end of the capacitor 504 is represented by $D_{BK}$.

A resistor 512 with a resistance R1 and a resistor 514 with a resistance R2 are connected in series between the first end of the capacitor 502 (or the terminal Out) and a feeder supplying the voltage Vin, and a node between the resistors 512 and 514 is connected to a positive input terminal (+) of an operational amplifier 520. The voltage supplied to the positive input terminal (+) of the operational amplifier 520 is determined by dividing the voltage (Vin–$V_L$) by the resistors 512 and 514, that is, k(Vin–$V_L$), where k denotes the coefficient determined by R2/(R1+R2).

A reference voltage Vref is supplied to a negative input terminal (–) of the operational amplifier 520. Thus, the operational amplifier 520 outputs a voltage in proportion to a difference voltage determined by subtracting the reference voltage from the divided voltage. In the present embodiment, when the output voltage $V_L$ is equal to a target voltage $V_A$, the reference voltage Vref is set so as to be determined by (Vin–$V_A$)*R2/(R1+R2).

The output of the operational amplifier 520 is connected to a gate of an n-channel transistor 522 serving as a variable resistor. A drain of the transistor 522 is connected to the ground Gnd, and a source of the transistor 522 is connected to an input terminal A of a comparator (determination unit) 526 and a source of an n-channel transistor 532 serving as a second switching element.

A defined voltage source 524 that outputs a defined voltage $V_{def}$ has a negative terminal connected to the ground Gnd, and a positive terminal connected to an input terminal B of the comparator 526.

Basically, the comparator (determination unit) 526 supplies a signal Cmp, which is at the low level only for a period of time Tw, to a common gate of the n-channel transistor 532 and a p-channel transistor 534 when the source voltage of the transistor 522 supplied to the input terminal A is decreased to the voltage $V_{def}$ applied to the input terminal B. In a period of time during which a control signal Ce is at the low level, however, the comparator 526 prohibits the signal Cmp from going to the low level regardless of the comparison result.

A source of the transistor 534 serving as a first switching element is connected to a feeder supplying the voltage $V_H$, and the common drains of the transistors 532 and 534 are connected to the second end of the capacitor 504. For convenience of illustration, the voltage at the second end of the capacitor 504, is represented by $C_{BK}$.

Figure 5:
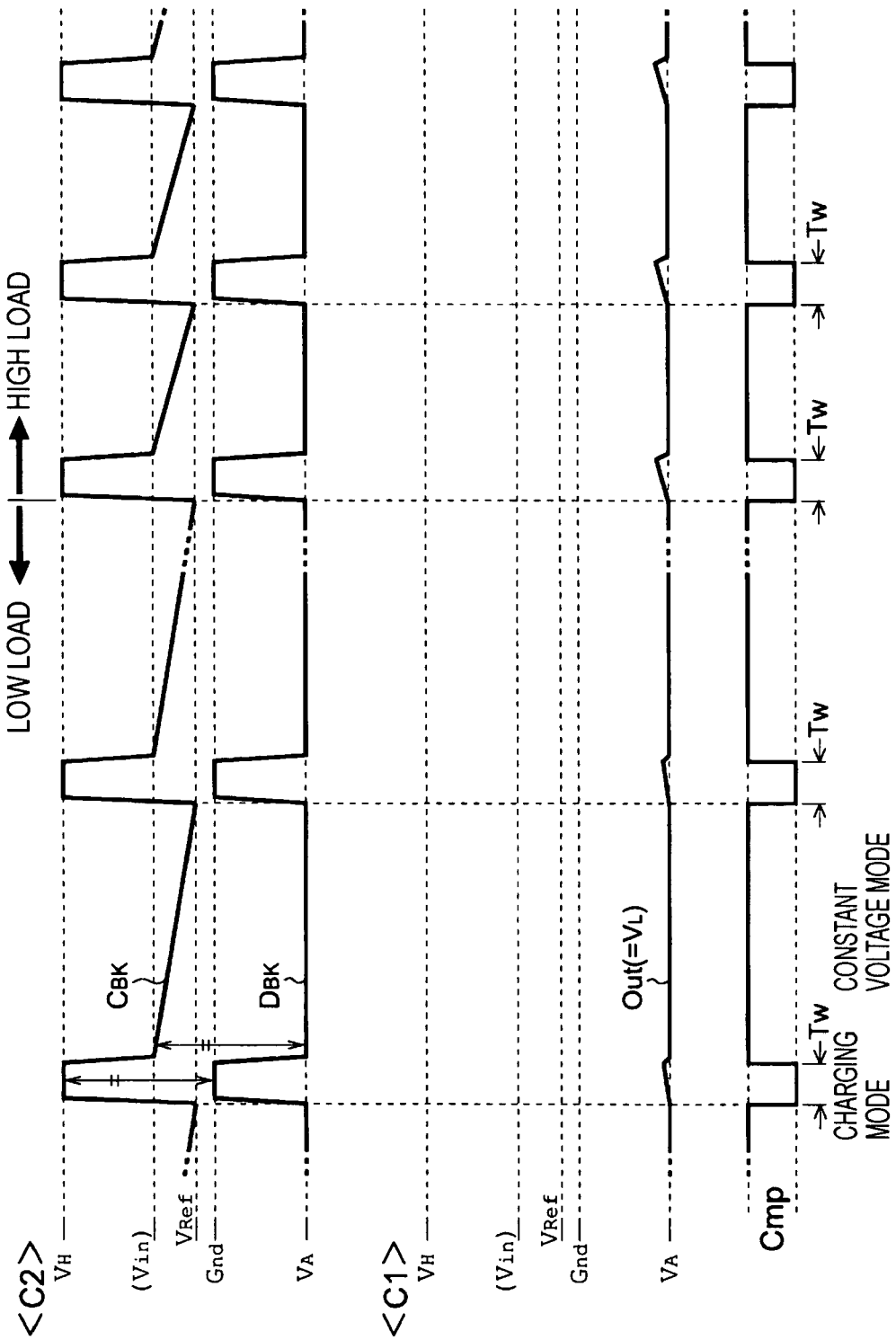
FIG. 5 is a voltage waveform diagram to show the operation of the voltage supply circuit.

The operation of the voltage supply circuit 50 is roughly separated into the operation in a charging mode (first mode) in which the signal Cmp is at the low level and the operation in a constant voltage mode (second mode) in which the signal Cmp is at the high level, and will be described mode-by-mode. FIG. 5 is a voltage waveform diagram to show the operation.

Figure 3:
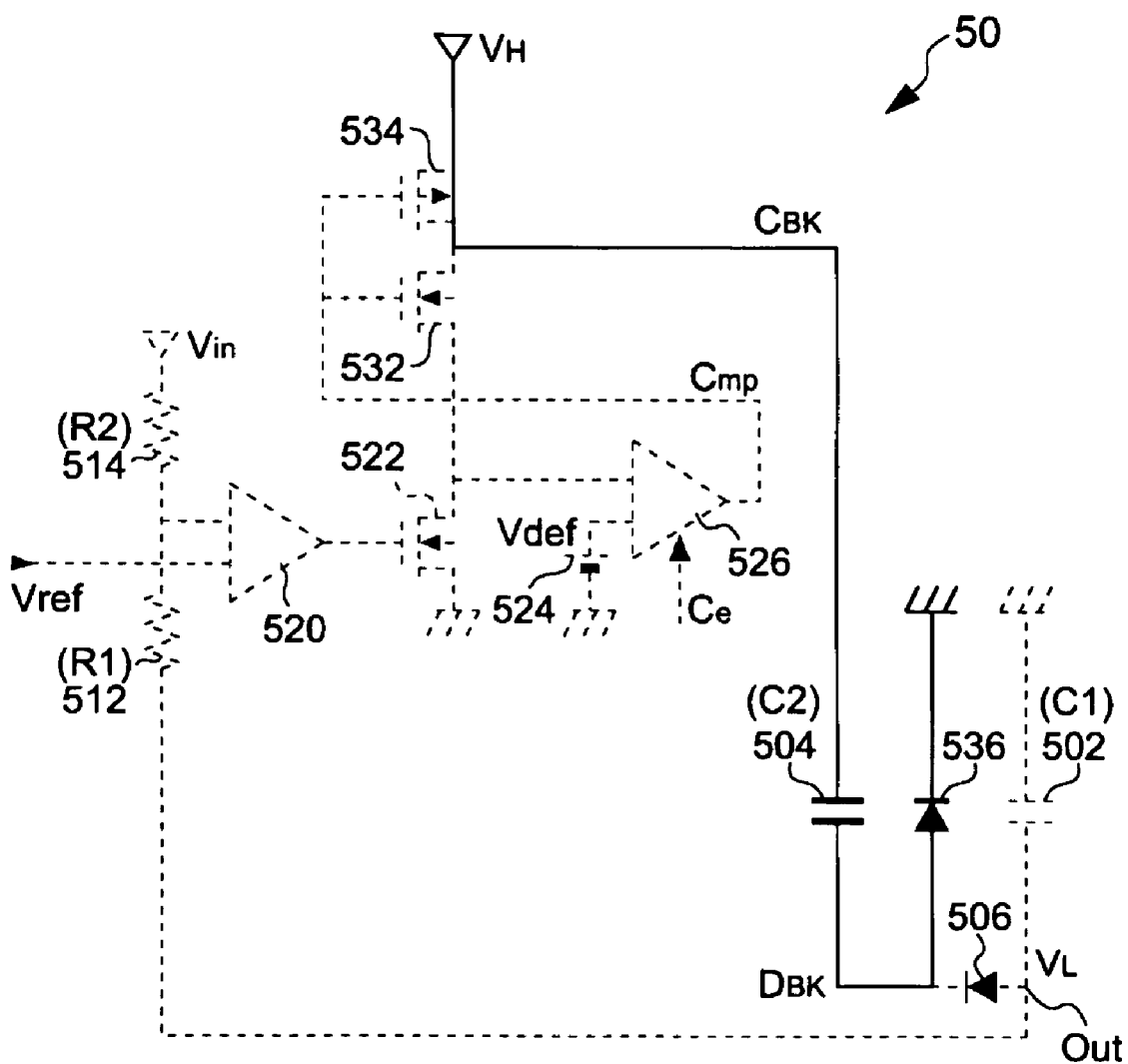
FIG. 3 is an equivalent circuit diagram to illustrate the voltage supply circuit in a charging mode.

In the charging mode in which the signal Cmp is at the low level, the transistor 532 is turned off and the transistor 534 is turned on, resulting in a circuit equivalent to a simplified circuit shown in FIG. 3. Specifically, as shown in FIG. 3, the first end of the capacitor 504 is connected to the ground Gnd via the forward-connected diode 536, and the second end of the capacitor 504 is connected to the feeder of the voltage $V_H$. As shown in FIG. 5, the voltage $D_{BK}$ at the first end of the capacitor 504 is grounded, or is set to the ground Gnd, and the voltage $C_{BK}$ at the second end of the capacitor 504 is set to the voltage $V_H$. Thus, the capacitor 504 is charged with the voltage ($V_H$–Gnd), wherein the voltage at the second end is higher.

In the charging mode, the voltage $D_{BK}$ is actually higher by the forward drop voltage of the diode 536 than the ground potential Gnd, which is not shown in FIG. 5 for simplification of illustration. In the charging mode, since the voltage $D_{BK}$ at the first end of the capacitor 504 is higher than the voltage at the output terminal Out, the diode 506 is reversely biased.

As described above, the signal Cmp is at the low level only for the period of time Tw, and the charging mode is followed by the constant voltage mode. In the constant voltage mode in which the signal Cmp is at the high level, the transistor 532 is turned on and the transistor 534 is turned off, resulting in a circuit equivalent to a simplified circuit shown in FIG. 4.

Figure 4:
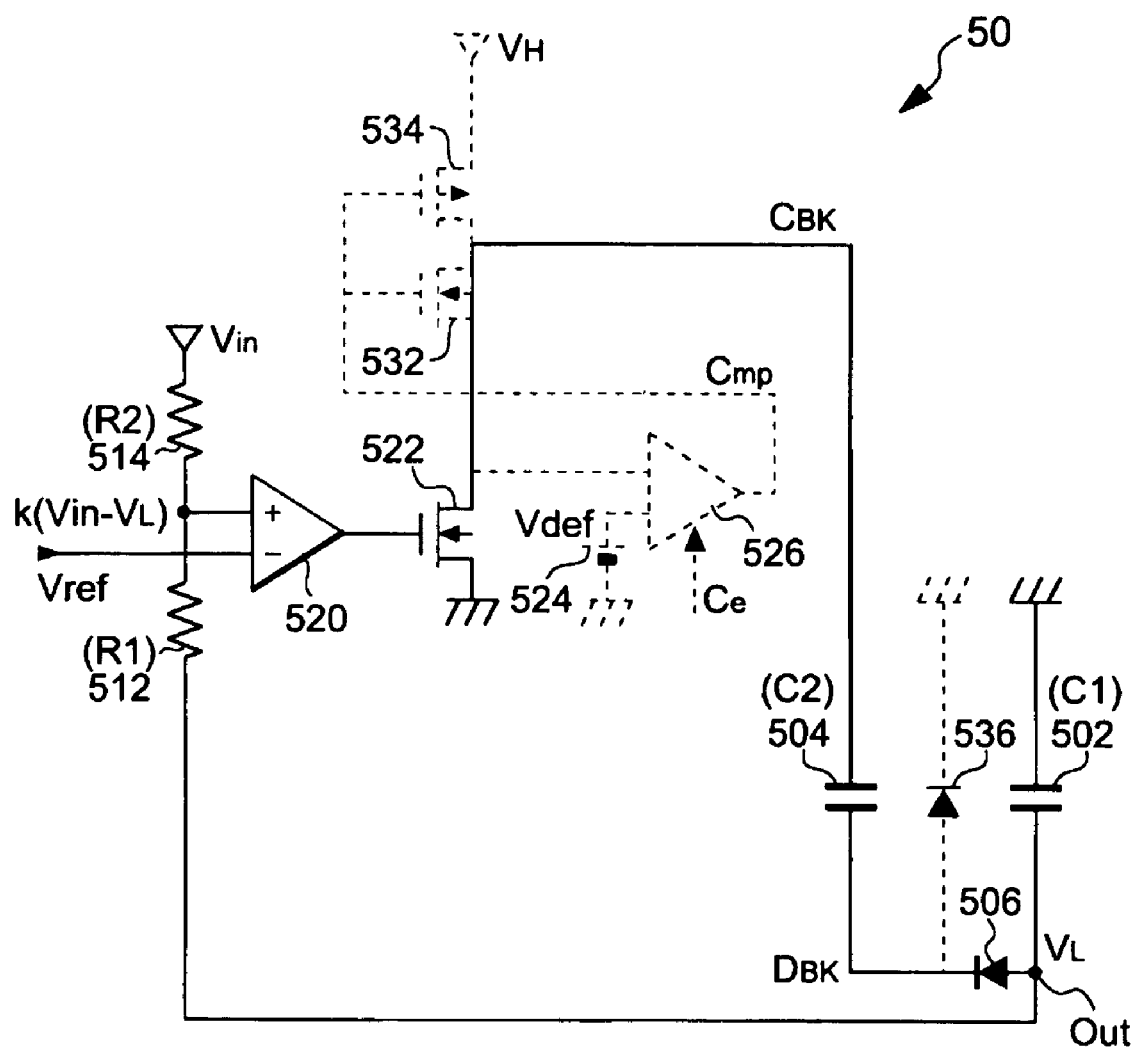
FIG. 4 is an equivalent circuit diagram to illustrate the voltage supply circuit in a constant voltage mode.

In FIG. 4, the resistance between the source and drain of the transistor 522 is determined by the output voltage of the operational amplifier 520. Once the resistance of the transistor 522 is determined, the voltage $C_{BK}$ at the second end of the capacitor 504 is determined.

The voltage $D_{BK}$ at the first end of the capacitor 504 is lower by the voltage $V_H$ than the voltage $C_{BK}$ at the second end of the capacitor 504 immediately after the change from the charging mode, and the divided voltage of this voltage is fed back to the positive input terminal (+) of the operational amplifier 520.

If the difference between the divided voltage and the reference voltage Vref is large, the output voltage of the operational amplifier 520 is also high, resulting in low resistance between the source and drain of the transistor 522. Thus, the voltage $C_{BK}$ is decreased, and the voltage $D_{BK}$ is also reduced so that the voltage $V_L$ of the output terminal Out decreases (or, in terms of absolute values, increases). If the difference between the divided voltage and the reference voltage Vref is small, the output voltage of the operational amplifier 520 is also low, resulting in high resistance between the source and drain of the transistor 522. Thus, the voltage $C_{BK}$ is increased, and the voltage $D_{BK}$ is also raised so that the voltage $V_L$ of the output terminal Out increases (or, in terms of absolute values, decreases).

When the voltage $V_L$ increases due to the power consumption of the load, the voltage $V_L$ is controlled so as to decrease so that the divided voltage and the reference voltage Vref, between which there exists a virtual short-circuit, are equal to each other.

The coefficient k in the divided voltage k(Vin–$V_L$) is determined by R2/(R1+R2), and, as described above, the reference voltage Vref is determined by (Vin–$V_A$)·R2/(R1+R2). Therefore, the operational amplifier 520 and the transistor 522 perform negative feedback control on the voltage (potential) $C_{BK}$ at the second end of the capacitor 504 so that the voltage $V_L$ is equal to the target voltage $V_A$.

In the constant voltage mode, when the voltage $C_{BK}$ at the second end of the capacitor 504 reaches the defined voltage $V_{def}$ by negative feedback control, the comparator 526 sets the signal Cmp to the low level again because the voltage $D_{BK}$ ($V_L$) cannot be stabilized by decreasing the voltage $C_{BK}$ lower than the defined voltage $V_{def}$, and changes to the charging mode. In the charging mode, only the capacitor 502 supplies a voltage to the load, and the voltage at the output terminal Out has a small ripple only in the charging mode, as shown in FIG. 5.

If the capacitance C1 of the capacitor 502 is larger than the capacitance C2 of the capacitor 504, the amount of decrease in the capacitor 504 is large with respect to the amount of charge consumed by the load. If the capacitance C1 of the capacitor 502 is absolutely small, the voltage $V_L$ is significantly increased in the charging mode. Therefore, the capacitance ratio between the capacitors 502 and 504 and the capacitance of the capacitor 502 are determined taking this background into consideration.

When the load is large, the voltage $C_{BK}$ is decreased at a higher speed, and, as shown in FIG. 5, the voltage $V_L$ is also stabilized at the target voltage $V_A$ in the constant voltage mode although the period of the constant voltage mode is shorter than that when the load is low.

In the constant voltage mode, the voltage $D_{BK}$ at the first end of the capacitor 504 is equal to a voltage ($V_L$–Vf) determined by subtracting a voltage drop Vf in the diode 506 from the voltage $V_L$. However, for simplification of illustration, the voltage $D_{BK}$ is zero in FIG. 5.

In the embodiment, the voltage $C_{BK}$ at the second end of the capacitor 504 is subjected to negative feedback control to stabilize the output voltage $V_L$ (or the voltage held by the capacitor 502) at the target voltage $V_A$. Since the voltage ($C_{BK}$–$D_{BK}$) held by the capacitor 504 and the amount of drop of the voltage $C_{BK}$ are in proportion to each other, the amount of drop of the voltage $C_{BK}$ may be feed-forward controlled depending on the voltage ($C_{BK}$–$D_{BK}$) held in the capacitor 504.

The defined voltage $V_{def}$ is preferably set low depending on the maximum load to ensure a necessary amount of charge in the capacitor 504.

In the embodiment, the output voltage $V_L$ is stabilized using the capacitors 502 and 504. The capacitors 502 and 504 are merely exemplary holding elements, and each of the capacitors 502 and 504 may be an element having an equivalent voltage holding function, e.g., a rechargeable battery.

An electro-optical device 10 including the voltage supply circuit 50 according to an embodiment of the invention will be described hereinbelow. The electro-optical device 10 is configured to drive an electro-optical panel by a voltage supplied from a power supply circuit 30 including the voltage supply circuit 50.

Figure 6:
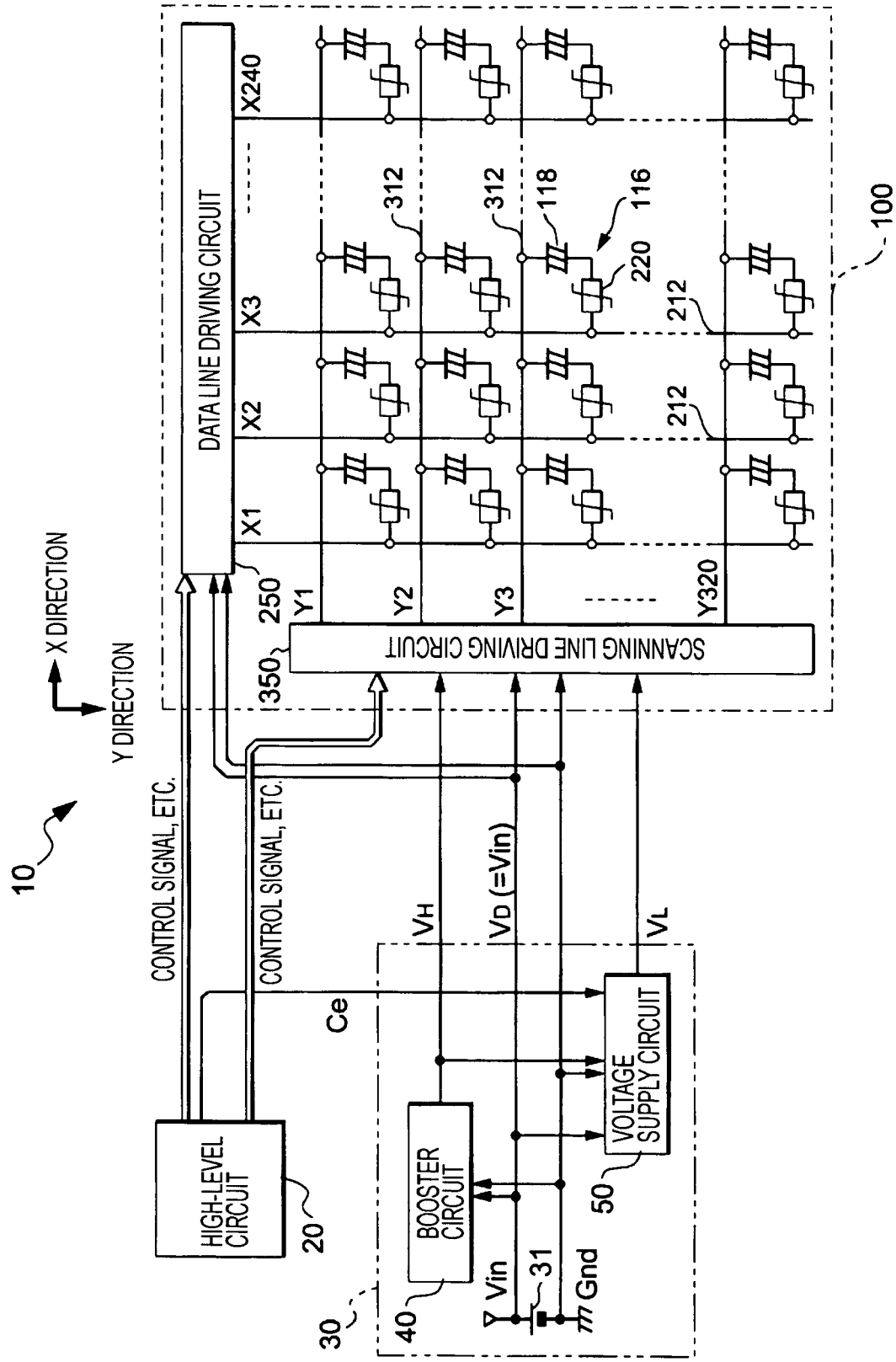
FIG. 6 is a diagram of an electro-optical device including the voltage supply circuit.

FIG. 6 is a block diagram of the electro-optical device 10.

As shown in FIG. 6, the electro-optical device 10 includes a high-level circuit 20, the power supply 30, and an electro-optical panel 100.

The high-level circuit 20 supplies data corresponding to the content to be displayed, control signals, etc., to the power supply circuit 30 and the electro-optical panel 100. The power supply circuit 30 includes a booster circuit 40 that generates a voltage $V_H$ from a voltage (Vin–Gnd) of a battery 31, and a voltage supply circuit 50 that inverts the voltage $V_H$ to produce a voltage $V_L$.

The electro-optical panel 100 includes an element substrate on which a plurality of data lines 212 extend in the column (Y) direction, and a counter substrate on which a plurality of scanning lines 312 extend in the row (X) direction, and the element substrate and the counter substrate are bonded together with a certain gap therebetween so that electrode-forming surfaces of these substrates face each other. For example, a twisted nematic (TN) liquid crystal is injected into the gap.

Pixels 116 are disposed at intersections of the data lines 212 and the scanning lines 312. Each of the pixels 116 includes a liquid crystal layer 118 and a thin-film diode (TFD) 220 connected in series with each other. For convenience of illustration, the total number of scanning lines 312 is 320 and the total number of data line 212 is 240. The pixels 116 are arranged into a matrix of 320 rows (vertical) by 240 columns (horizontal). The electro-optical panel 100 is not limited to this array of pixels.

The TFDs 220 have first ends connected to the data lines 212, and second ends connected to rectangular pixel electrodes (not shown) facing the scanning lines 312 serving as stripe electrodes.

The liquid crystal layers 118 are designed so that the liquid crystal is held between the scanning lines 312 serving as stripe electrodes and the rectangular pixel electrodes. The surfaces opposite to the facing surfaces of both substrates include polarizers (not shown), and the amount of light transmitted through the liquid crystal layers 118 varies depending on the RMS voltage between the stripe electrodes and the rectangular pixel electrodes.

Each of the TFDs 220 has a sandwiched structure of conductor-insulator-conductor, and has a diode switching characteristic that provides non-linear current-voltage characteristics in both the positive and negative directions. Thus, the TFDs 220 are conducting (turned on) when the voltage thereacross is equal to or higher than a threshold value, and are non-conducting (turned off) when it is lower than the threshold value.

A scanning line driving circuit 350 supplies scanning signals Y1 to Y320 to the first to 320th scanning lines 312, respectively, as described below. A data line driving circuit 250 supplies data signals X1 to X240 individually corresponding to the display content to the first to 240th data lines 212, respectively, as described below.

The voltage waveform of driving signals supplied to the electro-optical panel 100 will be described with reference to FIG. 7.

Figure 7:
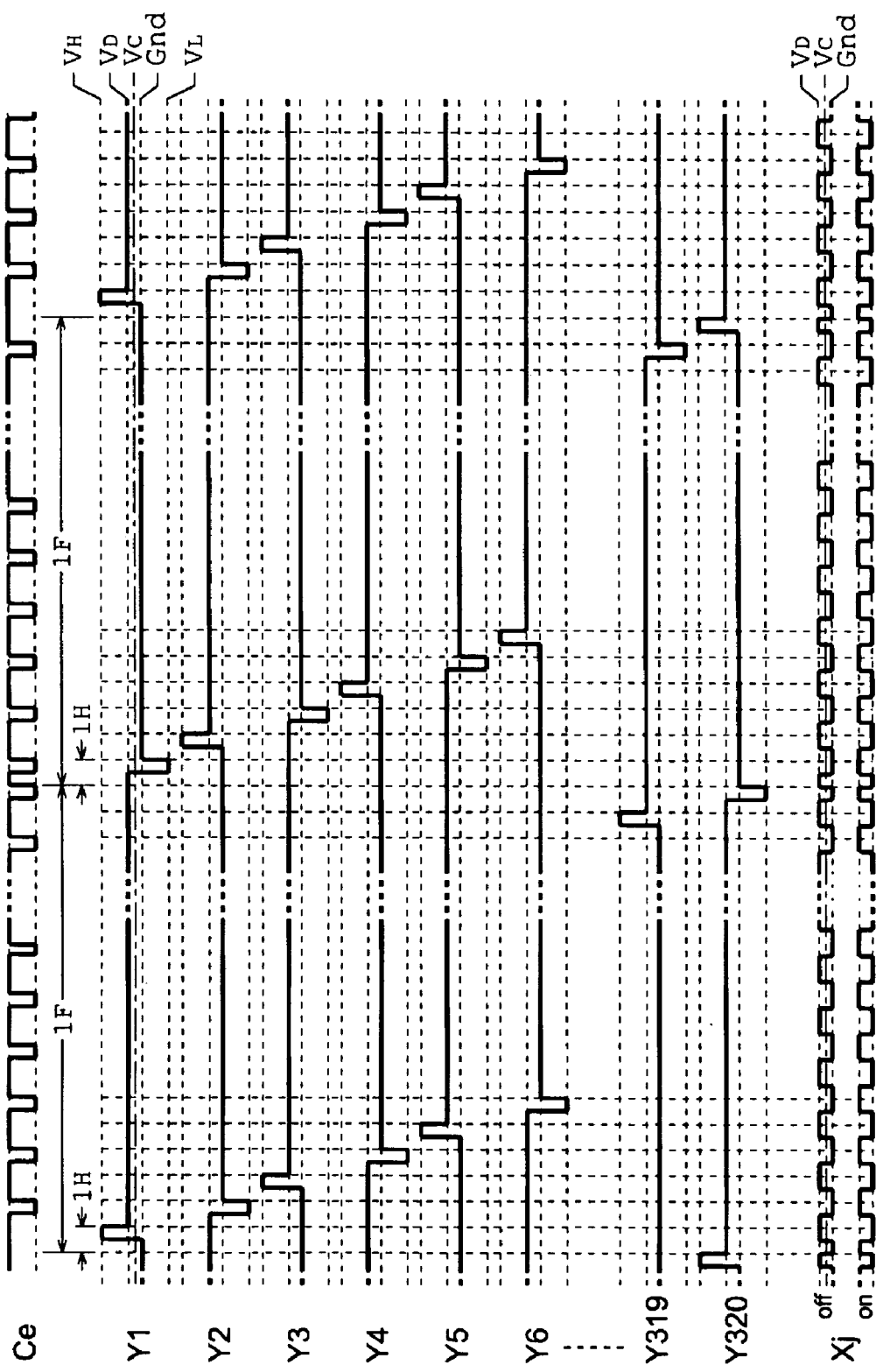
FIG. 7 is a voltage waveform diagram to show the operation of the electro-optical device.

As shown in FIG. 7, the scanning line driving circuit 350 sequentially selects the scanning lines 312 one-by-one every one horizontal scanning period (1H) from the beginning of one vertical scanning period (1F), and applies a selection voltage $V_H$ or $V_L$ in the latter half of this selection period, while applying a non-selection (held) voltage $V_D$ or Gnd in the remaining period.

The non-selection voltages $V_D$ and Gnd are voltages that are applied to the scanning lines 312, thereby turning off the TFDs 220 irrespective of the voltage of the data signal supplied to the data lines 212. The selection voltages $V_H$ and $V_L$ are voltages that are applied to the scanning lines 312, thereby turning on the TFDs 220 irrespective of the voltage of the data signal supplied to the data lines 212. The selection voltages $V_H$ and $V_L$ are symmetric with respect to an imaginary midpoint potential $V_C$ between the non-selection voltages $V_D$ and Gnd, wherein the voltage $V_H$ is a high-level voltage and the voltage $V_L$ is a low-level voltage.

In the electro-optical device 10, the high-level and low-level driving voltages are positive and negative with respect to the potential $V_C$ rather than the ground potential Gnd, respectively.

The voltages of the scanning signals Y1 to Y320 are determined depending on the selection state of the corresponding scanning lines 312. The scanning signals Y1 to Y320 will be described hereinbelow in the context of a scanning signal Yi supplied to the i-th scanning line 312 from the top shown in FIG. 6, where i denotes a general symbol to show the scanning lines and is an integer satisfying $1 \leq i \leq 320$. First, when the selection voltage $V_H$ is applied in the latter half of one horizontal scanning period (1H) during which the i-th scanning line 312 is selected, the scanning signal Yi is then maintained at the non-selection voltage $V_D$. Second, when one vertical scanning period (1F) has elapsed since the selection voltage $V_H$ was applied and the i-th scanning line 312 is selected again, the selection voltage $V_L$ is applied in the latter half of this horizontal scanning period, and the scanning signal Yi is then maintained at the non-selection voltage Gnd. This cycle is repeated.

When the selection voltage $V_H$ is applied as the scanning signal Yi, the scanning signal Y(i+1) supplied to the (i+1)-th scanning line 312 subsequent to the i-th scanning line 312 has the selection voltage $V_L$ that is opposite in polarity. When the selection voltage $V_L$ is applied as the scanning signal Yi, the scanning signal Y(i+1) has the selection voltage $V_H$ that is opposite in polarity. In each of the scanning signals Y1 to Y320, therefore, the selection voltages $V_H$ and $V_L$ are alternately selected every one horizontal scanning period.

The data line driving circuit 250 distributes either data voltage $V_D$ or Gnd depending on the display content of these pixels, and supplies the data voltage $V_D$ or Gnd as a data signal to the pixels 116 in the row corresponding to the scanning line 312 selected by the scanning line driving circuit 350 via the data lines 212.

In the present embodiment, the data voltages $V_D$ and Gnd may be voltages Vin and Gnd based on which the boosted voltage is produced in the power supply circuit 30. The data voltages $V_D$ and Gnd are also used as non-selection voltages of the scanning signals. The data voltages or the non-selection voltages of the scanning signals may separately be generated, and the data voltages and the non-selection voltages may be different from each other.

The data signals X1 to X240 will be described hereinbelow in the context of a data signal Xj supplied to the j-th data line 212 from the leftmost shown in FIG. 6, where j denotes a general symbol to show the data lines and is an integer satisfying $1 \leq j \leq 240$. It is presumed that the i-th scanning line 312 is selected and the display mode is a normally white mode in which the amount of light transmitted through the liquid crystal layers 118 is the maximum when applying no voltage.

The data signal Xj will be described in response to the scanning signal Yi. In a case of off-display (i.e., the maximum gray-level intensity of white displayed) on the pixel 116 of the i-th row and the j-th column disposed at the intersection of the selected i-th scanning line 312 and j-th data line 212, when the scanning signal Yi has the high-level selection voltage $V_H$ in the latter half of the horizontal scanning period during which the i-th scanning line 312 is selected, the data signal Xj has the low-level voltage Gnd in the former half of the same horizontal scanning period (1H) and has the high-level voltage $V_D$ that is the same in polarity as the selection voltage in the latter half thereof. When the scanning signal Yi has the low-level selection voltage $V_L$ in the latter half of the horizontal scanning period during which the i-th scanning line 312 is selected, the data signal Xj has the high-level voltage $V_D$ in the former half of the same horizontal scanning period (1H) and has the low-level voltage Gnd that is the same in polarity as the selection voltage in the latter half thereof.

In a case of on-display (i.e., the minimum gray-level intensity of black displayed) on the pixel 116 of the i-th row and the j-th column, when the scanning signal Yi has the high-level selection voltage $V_H$ in the latter half of the horizontal scanning period during which the i-th scanning line 312 is selected, the data signal Xj has the high-level voltage $V_D$ in the former half of the same horizontal scanning period (1H) and has the low-level voltage Gnd that is opposite in polarity to the selection voltage in the latter half thereof. When the scanning signal Yi has the low-level selection voltage $V_L$ in the latter half of the horizontal scanning period during which the i-th scanning line 312 is selected, the data signal Xj has the low-level voltage Gnd in the former half of the same horizontal scanning period (1H) and has the high-level voltage $V_D$ that is opposite in polarity to the selection voltage.

In a case of intermediate gray-level intensity displayed, as white turns to black, in the latter half period during which a selection voltage is applied, the period during which a voltage opposite in polarity to this selection voltage is applied is set longer, and in the former half period, a voltage opposite in polarity to that in the latter half period is set in advance, although not shown.

In the pixel 116, the TFD 220 is turned on when a selection voltage is applied in the latter half of the selection period, and a voltage corresponding to the display content is written to the liquid crystal layer 118. In the remaining period, the TFD 220 is turned off and the written voltage is held.

The voltage to be applied to the liquid crystal layer 118 is an AC driving voltage whose polarities are alternately reversed every vertical scanning period with respect to the imaginary midpoint potential $V_C$, thus preventing deterioration of the liquid crystal.

In this way, a selection voltage is applied to the scanning signal Yi not during one horizontal scanning period but during a half of the horizontal scanning period (1/2H), and the data signal Xj is applied in these two periods. Thus, regardless of the display pattern, the data signal Xj has the high-level voltage $V_D$ in one half of one horizontal scanning period (1H), and the data signal Xj has the low-level voltage Gnd in the other half. A constant RMS voltage is applied to the TFDs 220 regardless of the display content in the non-selection period, and therefore, the amount of off leakage in the TFDs 220 in the non-selection period becomes constant across all pixels 116, thus preventing the so-called smear phenomenon.

Since the invention is not directed to the driving waveform itself, a further description thereof is omitted. What is to be noted is that although the voltage supply circuit 50 generates the negative selection voltage $V_L$ from the positive selection voltage $V_H$, the selection voltage $V_L$ is used as a scanning signal only for a limited period.

More specifically, in the present embodiment, the selection voltages $V_H$ and $V_L$ are alternately used every one horizontal scanning period, and the selection voltage $V_H$ or $V_L$ is applied to the scanning lines 312 not during one horizontal scanning period but during the latter half period (1/2H). Thus, the voltage $V_L$ supplied by the voltage supply circuit 50 is actually applied to either scanning line 312 only for a quarter of the horizontal scanning period. However, if the voltage $V_L$ varies, the voltages held in the liquid crystal layers 118 when the TFDs 220 are turned on also vary, and the RMS voltages differ pixel-by-pixel, leading to low display quality.

In the electro-optical device 10, the period during which the voltage $V_L$ is used as a selection voltage applied to the scanning lines 312 is set to the constant voltage mode so that the voltage $V_L$ is stabilized, and the change to the charging mode is allowed in the period during which the voltage $V_L$ is not used as a selection voltage applied to the scanning lines 312.

Specifically, the high-level circuit 20 supplies a control signal Ce to the voltage supply circuit 50. The control signal Ce is at the low level in the period during which the voltage $V_L$ is used as a selection voltage, and is at the high level in the remaining period (see FIG. 7).

When the control signal Ce is at the low level, as described above, the comparator 526 in the voltage supply circuit 50 maintains the signal Cmp at the high level regardless of the result of comparison between the voltage $C_{BK}$ and the defined voltage $V_{def}$. Thus, the change to the charging mode is prohibited. In the charging mode, since only the capacitor 502 supplies the voltage $V_L$ to the load from the output terminal Out, the voltage $V_L$ increases from the target voltage, $V_A$ and a ripple occurs. However, in the period during which the voltage $V_L$ is supplied to the scanning lines 312 as loads, the change to the charging mode is prohibited. In the period during which the selection voltage $V_L$ is supplied to the scanning lines 312, therefore, the constant voltage mode is fixed, and the voltage $V_L$ is controlled so as to be stabilized at the target voltage $V_A$.

According to the present embodiment, therefore, in the period during which the voltage $V_L$ is applied as a selection voltage, the voltage $V_L$ is stabilized at the target voltage $V_A$, thus preventing a reduction in display quality due to variations in voltage.

In the case of low output performance for the voltage $V_H$ in the booster circuit 40, the voltage supply circuit 50 that charge-pumps the voltage $V_H$ serves as a load, and the voltage $V_H$ may vary. In practice, therefore, it is preferable that the change to the charging mode is prohibited even in the period during which the voltage $V_H$ is used as a selection voltage.

While the voltage supply circuit 50 according to the present embodiment generates the voltage $V_L$ by charge-pumping the positive voltage $V_H$, the booster circuit 40 may generate the negative voltage $V_L$ and may supply the charge-pumped voltage $V_L$ as the voltage $V_H$ by charge-pumping. In the structure in which the voltage $V_H$ is supplied, the voltage at the second end of the capacitor 504 is raised so that the positive output voltage at the first end of the capacitor 502 become constant. Even in the structure in which a positive voltage is supplied, like the structure in which a negative voltage is supplied to the load, the potential at the second end of the capacitor 504 is shifted towards the potential at the first end of the capacitor 502.

In the driving waveform shown in FIG. 7, one horizontal scanning period (1H) is divided into the former half period and the latter half period, and a selection voltage is applied in the latter half period. A selection voltage may be applied in the former half period, or may be applied during one horizontal scanning period (1H) without dividing the horizontal scanning period into the former half period and the latter half period. In either case, the mode change is appropriately determined by the signal Ce.

While the electro-optical panel 100 in the embodiment is of the normally white mode in which white is displayed when applying no voltage, it may be of the normally black mode in which black is displayed when applying no voltage.

The electro-optical panel 100 is not limited to the transmissive type, and may be of the reflective or the intermediate semi-transmissive and semi-reflective type. In the electro-optical panel 100, the TFDs 220 are connected to the data lines 212, and the liquid crystal layers 118 are connected to the scanning lines 312. Conversely, the TFDs 220 may be connected to the scanning lines 312, and the liquid crystal layers 118 may be connected to the data lines 212.

Each of the TFDs 220 is a two-terminal switching element, by way of example. Two-terminal switching elements include a ZnO (zinc oxide) varistor, an MSI (Metal Semi-Insulator) diode, and a two-terminal switching element having a combination thereof connected in series or in parallel in the opposite directions.

While two-terminal switching elements such as the TFDs 220 are used as active elements in the embodiment, three-terminal switching elements such as TFTs (thin-film transistors) may be used.

While the embodiment has been described in the context of TN liquid crystal, super twisted nematic (STN) liquid crystal or guest-host liquid crystal may be used. In the guest-host liquid crystal, a molecular dye (the guest) having anisotropic absorption of visible light in the long-axis direction and the short-axis direction of the molecules is dissolved in a liquid crystal (the host) having a certain molecular arrangement, and the dye molecules are aligned in parallel to the liquid crystal molecules. Another possible structure may be vertical orientation (homeotropic alignment) in which the liquid crystal molecules are vertically arranged with respect to both substrates when applying no voltage and the liquid crystal molecules are horizontally arranged with respect to both substrates when applying a voltage, or may be parallel (horizontal) orientation (homogeneous) in which the liquid crystal molecules are horizontally arranged with respect to both substrates when applying no voltage and the liquid crystal molecules are vertically arranged with respect to both substrates when applying a voltage. Various types of liquid crystal or orientation methods may be used as far as they are suitable for the driving method according to an aspect of the invention.

Other than the liquid crystal device, an embodiment of the invention may also be applied to an organic electroluminescent (EL) device, a fluorescent display tube, an electrophoresis device, or an electro-optical device such as a plasma display.

The pixels 116 may be arranged in correspondence with primary colors, i.e., red (R), green (G), and blue (B), and color display may be provided by expressing one dot using three pixels.

Figure 8:
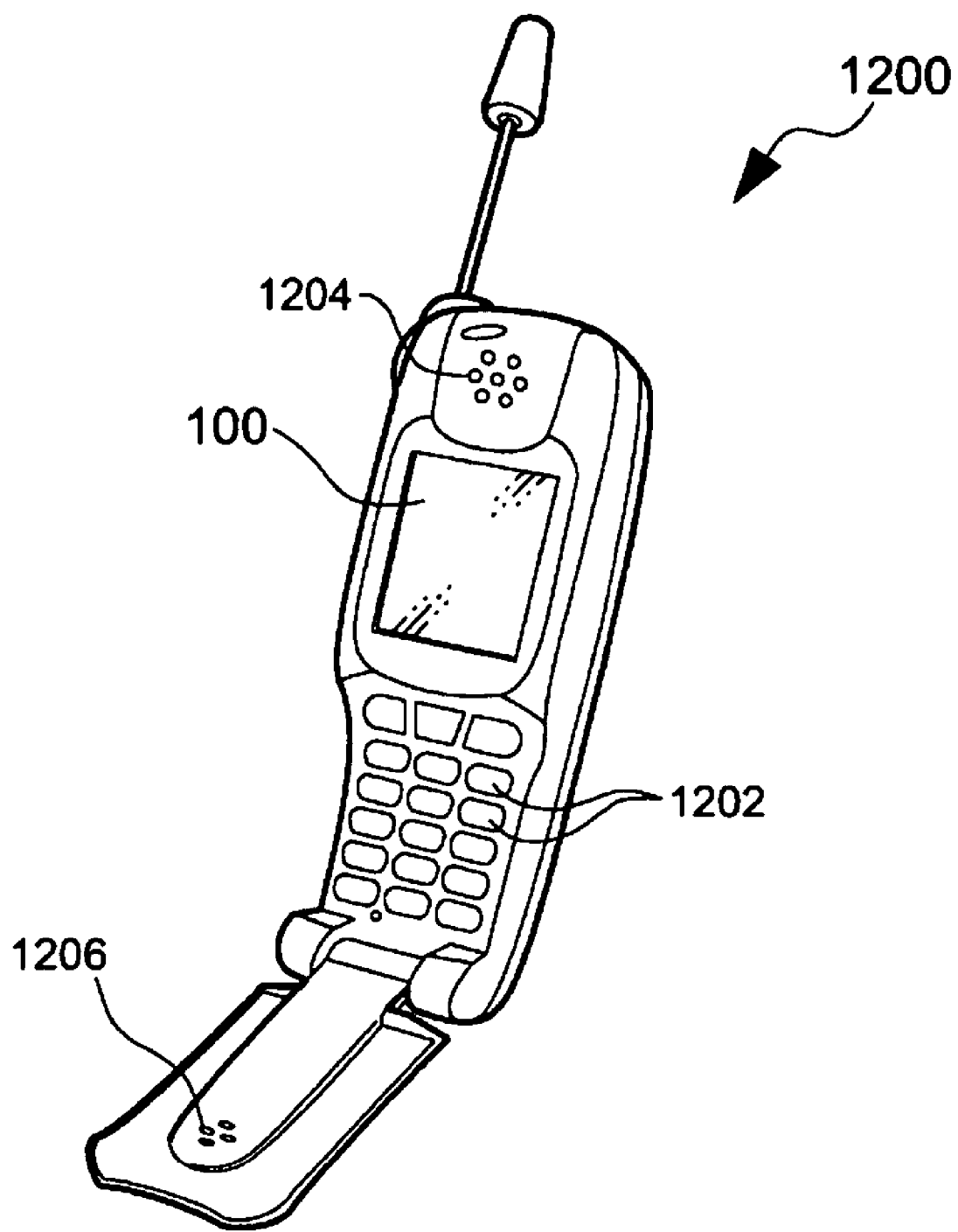
FIG. 8 is a perspective view of a portable telephone including the electro-optical device.

An electronic apparatus including the electro-optical device 10 according to the embodiment as a display device will now be described. FIG. 8 is a perspective view of a portable telephone 1200 including the electro-optical device 10 according to the embodiment.

As shown in FIG. 8, the portable telephone 1200 includes a plurality of operation buttons 1202, an earpiece 1204, a mouthpiece 1206, and the electro-optical panel 100 described above. The components other than the electro-optical panel 100 in the electro-optical device 10 are contained in the telephone, and do not appear.

The electro-optical panel 100 used as a display section of the portable telephone 1200 prevents variations of a selection voltage, and can provide high-quality display.

Electronic apparatuses including the electro-optical device 10 may include, other than the portable telephone 1200 shown in FIG. 8, a digital still camera, a notebook personal computer, a liquid crystal television, a video tape recorder of the viewfinder type or monitor direct vision type, a car navigation system, a pager, an electronic organizer, an electronic calculator, a word processor, a workstation, a television telephone, a point-of-sale (POS) terminal, and an apparatus with a touch panel. The electro-optical device 10 can be used as display devices of these electronic apparatuses. These electronic apparatuses can provide low power consumption.

What is claimed is:

1. A voltage supply circuit comprising:
   a first holding element with a first end and a second end that supplies a voltage held between the first end and the second end to a load, the second end being connected to a ground;
   a second holding element with a first end and a second end, the first end of the second holding element being electrically connected to the first end of the first holding element;
   a charging circuit that, during a first mode, charges the second holding element with a voltage higher than the voltage to be supplied to the load; and
   a potential adjusting circuit that, during a second mode that is separate from the first mode, shifts a potential at the second end of the second holding element towards a potential at the first end of the first holding element according to the voltage held by the first holding element or the second holding element,
   wherein the potential adjusting circuit includes:
      an operational amplifier that receives a voltage corresponding to the voltage held by the first holding element and a reference voltage according to the target voltage and that outputs a voltage in proportion to the difference between the received voltage and the reference voltage; and
      a variable resistor electrically connected between a predetermined potential line and the second end of the first holding element, the variable resistor having a variable resistance depending on an output voltage from the operational amplifier.

2. The voltage supply circuit according to claim 1, wherein the potential adjusting circuit shifts the potential at the second end of the second holding element so that the voltage held by the first holding element is equal to a predetermined target voltage.

3. The voltage supply circuit according to claim 1, wherein the charging circuit includes:
   a determination unit that determines in the second mode whether or not the potential at the second end of the second holding element reaches a predetermined threshold value and that changes to the first mode for a predetermined period of time when the determination unit determines that the potential reaches the predetermined threshold value;
   a first switching element that is turned on in the first mode to connect the second end of the second holding element to a feeder supplying the voltage higher than the voltage to be supplied to the load; and
   a second switching element that is turned on in the second mode to connect the second end of the second holding element to an end of the variable resistor.

4. An electro-optical device comprising:
   the voltage supply circuit according to claim 1;
   pixels disposed at intersections of a plurality of scanning lines and a plurality of data lines;
   a scanning line driving circuit that sequentially selects the scanning lines and that applies the voltage held in the first holding element to a selected scanning line as a selection voltage; and
   a data line driving circuit that supplies data signals via the data lines to pixels corresponding to the scanning line to which the selection voltage is applied.

5. The electro-optical device according to claim 4, wherein the change from the second mode to the first mode is prohibited in a period during which the voltage held in the first holding element is applied as the selection voltage.

6. An electronic apparatus comprising the electro-optical device according to claim 4.

7. A voltage supply method using a first holding element with a first end and a second end that supplies a voltage held between the first end and the second end to a load, the second end of the first holding element being connected to a ground, and a second holding element with a first end and a second end, the first end of the second holding element being electrically connected to the first end of the first holding element, the method comprising:
   charging the second holding element with a voltage higher than the voltage to be supplied to the load;
   shifting, at a different timing from charging the second holding element, a potential at the second end of the second holding element towards a potential at the first end of the first holding element according to the voltage held by the first or second holding element;
   receiving a voltage corresponding to the voltage held by the first hold mg element and a reference voltage according to the target voltage by an operational amplifier;
   outputting a voltage in proportion to the difference between the received voltage and the reference voltage; and
   providing a variable resistance electrically connected between a predetermined potential line and the second end of the first holding element,
   wherein resistance of the variable resistance depends on an output voltage from the operational amplifier.

\* \* \* \* \*

UNITED STATES PATENT AND TRADEMARK OFFICE
CERTIFICATE OF CORRECTION

PATENT NO. : 7,551,171 B2
APPLICATION NO. : 11/211357
DATED : June 23, 2009
INVENTOR(S) : Fusahi Kimura et al.

Page 1 of 1

It is certified that error appears in the above-identified patent and that said Letters Patent is hereby corrected as shown below:

Title Page, Add
--(73) Assignee: Seiko Epson Corporation (JP)--

Col 4, lines 17-18, "$(Vin-V_A)*R2/(R1+R2)$." should be --$(Vin-V_A) \cdot R2/(R1+R2)$.--

Col 5, line 42, "$(Vin-V_A).R2/(R1+R2)$." should be --$(Vin-V_A) \cdot R2/(R1+R2)$.--

Col 12, line 56, "hold mg" should be --holding--

Signed and Sealed this

Fifth Day of January, 2010

David J. Kappos
*Director of the United States Patent and Trademark Office*